Sept. 2, 1958  G. H. RAWCLIFFE  2,850,690
INDUCTION MOTORS
Filed Jan. 31, 1957  4 Sheets-Sheet 1
FIG. 1.
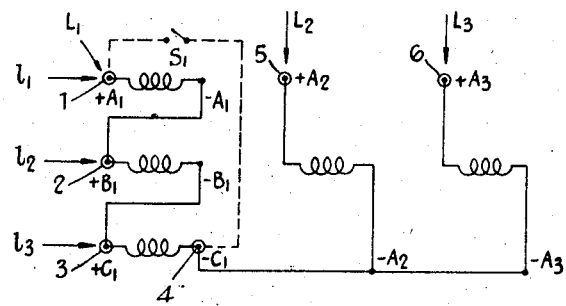
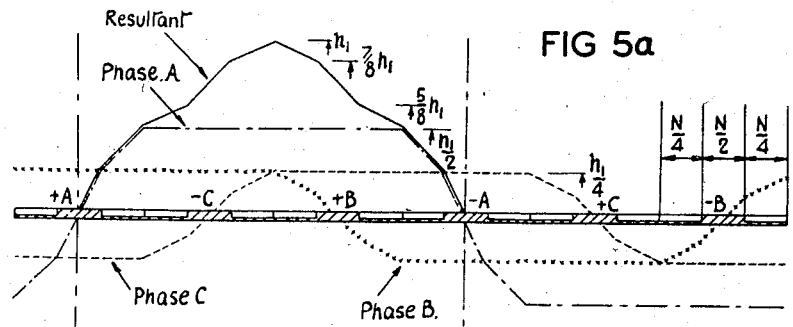
FIG 5a
FIG. 5c.
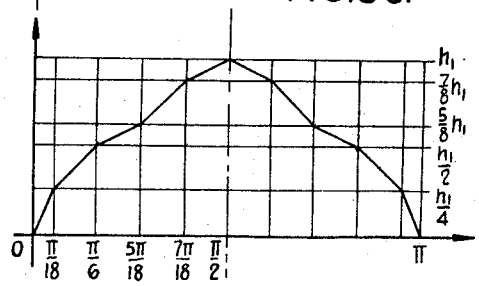
FIG. 5b.
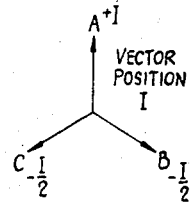
Inventor:
Gordon Hindle Rawcliffe
By: Stevens, Davis, Miller & Mosher
Attorneys Sept. 2, 1958    G. H. RAWCLIFFE    2,850,690
INDUCTION MOTORS
Filed Jan. 31, 1957    4 Sheets-Sheet 2
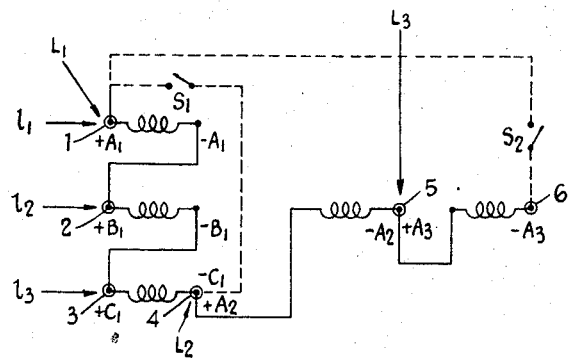
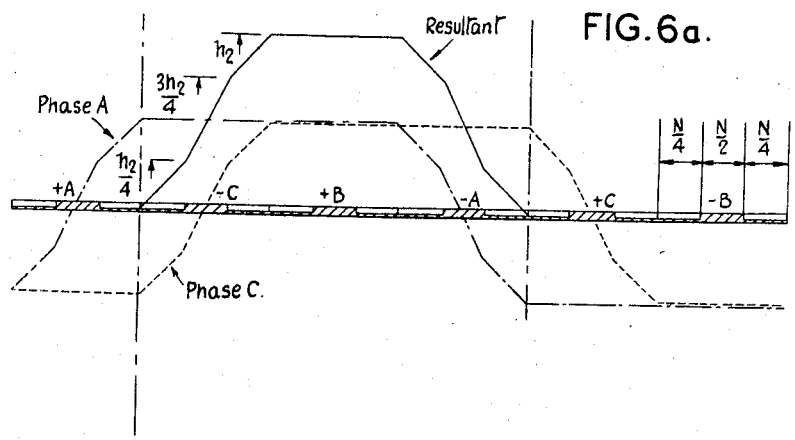
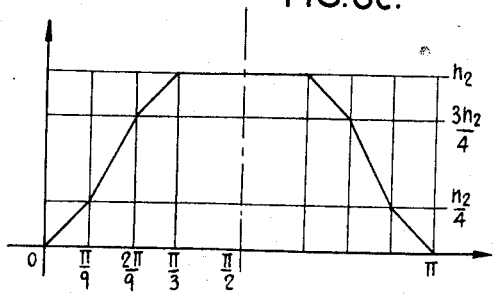
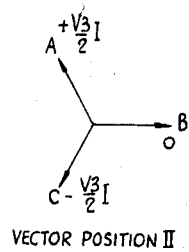

Sept. 2, 1958     G. H. RAWCLIFFE     2,850,690
INDUCTION MOTORS
Filed Jan. 31, 1957     4 Sheets-Sheet 4
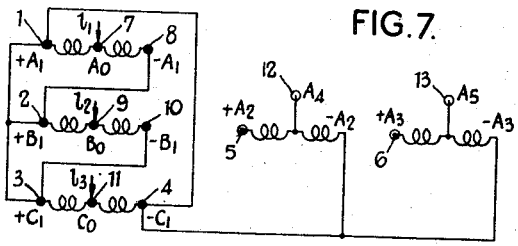
FIG. 7.
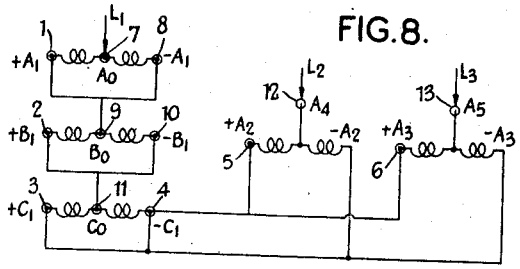
FIG. 8.
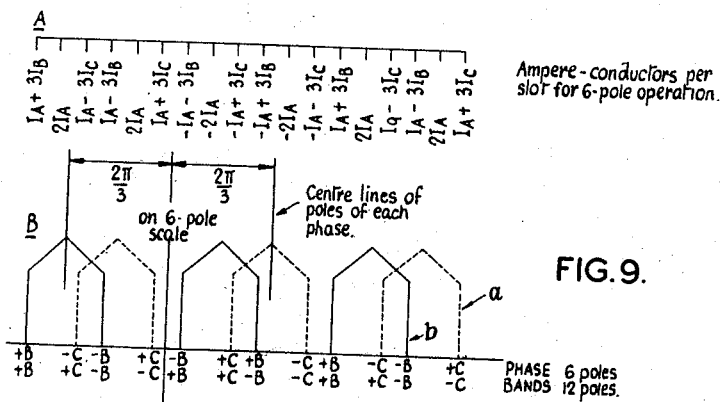
FIG. 9.
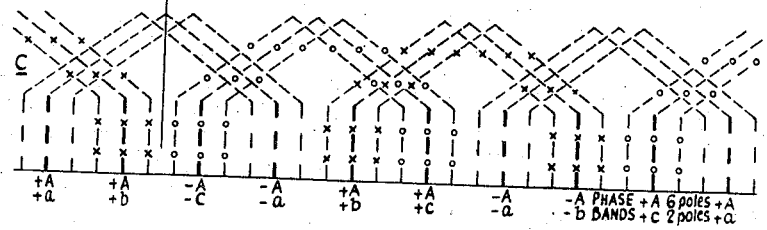
Inventor:
Gordon Hindle Rawcliffe
By Stevens, Davis, Miller & Mosher
Attorneys

United States Patent Office 2,850,690
Patented Sept. 2, 1958

2,850,690
INDUCTION MOTORS

Gordon Hindle Rawcliffe, Clifton, Bristol, England, assignor to National Research Development Corporation, London, England Application January 31, 1957, Serial No. 637,402

Claims priority, application Great Britain February 14, 1956

13 Claims. (Cl. 318—224)

The present invention relates to induction motors and has for its object to provide a three-phase induction motor adapted to run at either of two speeds related in the ratio 3:1.

A further object of one form of the invention is to provide such a motor adapted to run at any of four speeds related in the ratio 6:3:2:1.

It is known to provide three-phase motors in which, by changing the connections to the windings, the effective number of poles is changed so that the motor can be made to run at different speeds. Although satisfactory motors are known and widely used for two speeds related in the ratio 2:1, when attempts have been made to provide for the ratio 3:1, many difficulties have been experienced. Not the least of these is to provide a motor which is free from a tendency to "crawl" when connected for one or the other speed. "Crawling" is the operation of the motor when it runs at a sub-multiple of its proper running speed and this condition arises from the harmonic content of the magneto-motive force waveform. The harmonics of the magneto-motive force waveform have the same effect as if the motor were wound with a larger number of poles to which the lower speed corresponds. As is well known, the seventh harmonic is the most important, since the third harmonics produced by the three phases tend to neutralise one another while the fifth corresponds to a backwardly rotating field.

In my co-pending application Serial No. 593,674, there is described a 3-phase pole-changing induction motor having three phase windings, each of 120° spread, each divisible into three 40° sections, and adapted to be connected alternatively as a 3-phase delta winding of 120° phase spread or a 3-phase star winding of 120° phase spread, said delta winding being distributed to provide $n$ poles and said star winding being distributed to provide $3n$ poles, said delta winding omitting one 40° section of each of said phase-windings, the arrangement being such that when connected in delta the machine is adapted to run at substantially three times the speed of said machine when connected in star.

In an induction motor according to the invention described in said co-pending patent application, when operated at the higher speed, only ⅔ of each phase-winding, that is 80° out of the 120° spread, is in circuit, but the winding arrangement is completely symmetrical at both speeds. Such a winding arrangement involves bringing out eleven control leads for the purpose of effecting the change of connections required for operation at the alternative speeds.

It is an object of the present invention, to provide a 3-phase pole-changing induction motor requiring only six leads to be brought out for the three-to-one pole changing. A construction according to the present invention serves also to avoid crawling if the motor is switched directly into its higher speed and it also permits a high rating to be obtained at both the alternative speeds.

If a standard 3-phase 4-pole delta-connected winding is opened at one corner, it can be fed in series to form one phase of a 12-pole winding. If two further 12-pole windings, of normal pitch, are wound and suitably disposed in the same stator, the three windings together will give a 3-phase 12-pole rotating field. This is the principle of construction used in machines according to the present invention.

According to the present invention, a 3-phase pole-changing induction motor has a first set of three phase-windings each of 60° spread, each wound into three stator slots or a multiple of three slots, adapted to be connected as a 3-phase delta winding distributed to provide $n$ poles or to be connected as one phase of a delta or star winding distributed to provide $3n$ poles and having two further phase-windings each of 60° spread wound in the outer slots of each group of three adapted to be connected as the other two phases of a delta or star winding distributed to provide $3n$ poles, the first set of phase-windings comprising N conductors of which more than one third are wound in the centre slot of each group of three and the remaining conductors are substantially equally divided between the two outer slots of the group and the further two phase-windings each having fewer than N conductors, the arrangement being such that when connected to provide $n$ poles, the machine runs at three times the speed of the machine when connected to provide $3n$ poles and the 7th harmonic content of the magnetomotive force waveform when the machine is connected to provide $n$ poles is less than if the conductors of the first set of phase windings are equally divided between the three slots of each group.

A particular feature of the invention is the novel method of distributing and interconnecting the conductors in the 4-pole winding and of relating these conductors to those in the 12-pole phases, whereby the objects of the invention are achieved.

The 3-phase 12-pole winding is necessarily asymmetrical in form but it is distributed so as to operate symmetrically and to take an almost balanced current.

In order that the invention may be readily carried out, two embodiments will now be specifically described, by way of example, with reference to the accompanying drawings in which:

Figure 1 is a circuit diagram showing the coil arrangements of a 4-pole delta, 12-pole star stator of a pole-changing induction motor;

Figure 2 is a circuit diagram showing the coil arrangement of a 4-pole delta, 12-pole delta stator of a pole-changing induction motor;

Figure 4:
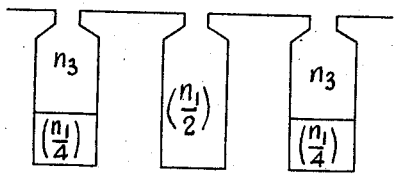
Figure 4 is a diagram representing a cross section through a group of three stator slots showing the distribution of windings therein.

Figure 5a is a diagram representing the winding distribution as shown in Figure 4 together with the M. M. F. waveform produced thereby for the vector position shown in Figure 5b;

Figure 5c is a diagram showing the geometry of the resultant waveform shown in Figure 5a;

Figure 6a is a diagram representing the winding distribution as shown in Figure 4 together with the M. M. F. waveform produced thereby for the vector position shown in Figure 6b;

Figure 6c is a diagram showing the geometry of the resultant waveform shown in Figure 6a;

Figure 7 is a circuit diagram showing a coil arrangement for 2-pole parallel-star operation;

Figure 8 is a circuit diagram showing a coil arrangement for 6-pole parallel-star operation and Figure 9 is a diagram showing the distribution of coil sides in the stator slots for the coil arrangements shown in Figures 7 and 8.

In Fig. 1, five coils are shown forming the stator winding of a 4-pole delta, 12-pole star pole-changing induction motor. The coils between the terminals 1, 2; 2, 3 and 3, 4 form the three coils of the 4-pole delta arrangement and for this condition the pole-changing switch $S_1$ shown connected to terminals 1 and 4 by broken lines, is closed.

The coils between the terminals 4, 5 and 4, 6 are the additional coils comprising the 12-pole star arrangement. In this condition the switch $S_1$ is open.

When operating the machine as a 4-pole motor, the three phase inputs are applied at the points $1_1$, $1_2$ and $1_3$. When operating the machine as a 12-pole motor, the three phase inputs are applied at the points $L_1$, $L_2$ and $L_3$. From this it will be seen that connections to the windings have to be changed, for the alternative operating conditions, only at the six terminal points shown at 1–6 in the drawing.

In Figure 2, five coils are shown forming the stator winding of a 4-pole delta, 12-pole delta pole changing induction motor. The coils between the terminals 1—4 correspond exactly to the coils of the arrangement shown in Figure 1 and operate as a 4-pole delta winding with the switch $S_1$ closed.

The coils between the terminals 4, 5 and 5, 6 are the additional coils comprising the 12-pole delta arrangement. For this condition, a switch $S_2$, shown connected to the terminals 1 and 6, is closed.

When operating the machine as a 4-pole motor, the three phase inputs are applied at the points $1_1$, $1_2$ and $1_3$, as for Figure 1. When operating the machine as a 12-pole motor, the three phase inputs are applied at the points $L_1$, $L_2$ and $L_3$. Again it will be seen that pole-changing involves changes of the connections only at the six terminals shown at 1–6 in the drawing.

The 4-pole delta, 12-pole delta arrangement shown in Figure 2 is the coil arrangement of the preferred embodiment described below.

It is always necessary for machines based on the principle of this invention to use 3, 6 or 9 slots per pole per phase, to give the correct angular phasing of the spaces for the higher number of poles. The preferred embodiment to be described uses 3 slots per pole per phase.

In order that the normal 3-phase 4-pole winding and the additional 12-pole windings may be included in the same stator frame, it is necessary to modify the distribution of the 4-pole motor having no pole-changing arrangements. One possible modification is to reduce the gauge of wire in the outer two slots of each group of three, so as to leave space for the 12-pole windings, without altering the number of conductors per slot of the 4-pole winding.

However, this arrangement results in very uneven heating of the winding, and it is preferred to alter the distribution of conductors in each 60° phase band of the 4-pole winding so that one quarter of the total number of conductors required per phase band is situated in each of the outer slots of a group of three and the remaining half is contained in the central slot. This arrangement permits conductors of comparable, but not equal, gauge to be used in all the slots of the 4-pole winding.

Figure 3:
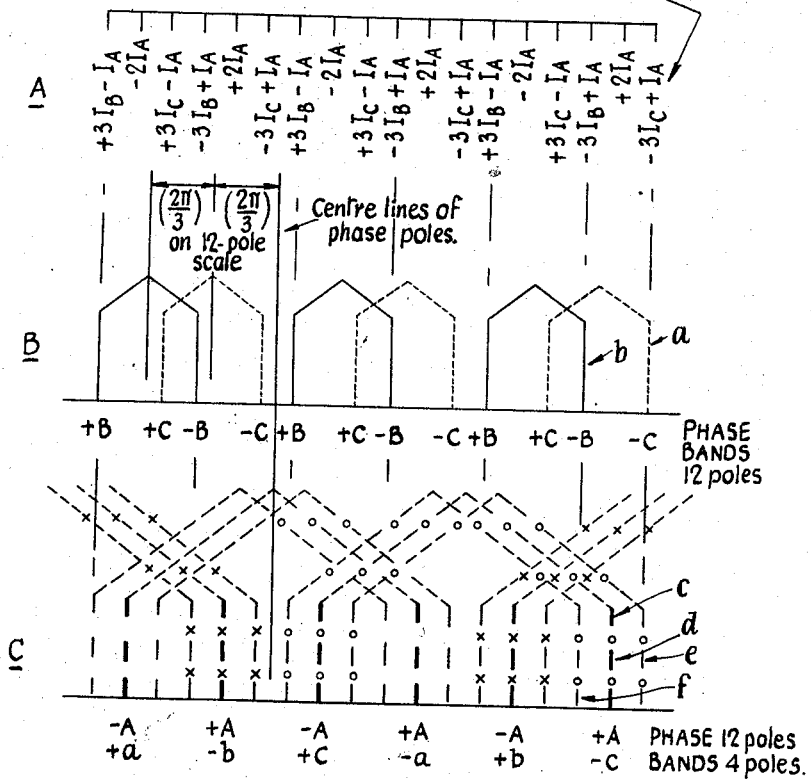
Figure 3 is a diagram showing the distribution of coil sides in the stator slots for a coil arrangement as shown in Figure 2.

Figure 3 shows the distribution of coil sides in the groups of three slots with such an arrangement. At A there is shown the ampere-conductors per slot to an arbitrary scale. At B there are shown six coils representing six poles of the 12-pole windings. The corresponding phases are marked in relation to each coil and the + and − signs represent respectively the "go" and "return" coil sides respectively in conventional manner.

The two sets of coils indicated at $a$ and $b$ correspond to the coils between the terminals 4, 5 and 5, 6 in Figure 2. These windings fill the upper parts of two outer slots of each group of three. Coils corresponding to the windings between terminals 1, 2; 2, 3 and 3, 4 of Figure 2 are shown at C in Figure 3 where the pairs of coil sides in 18 slots, one half the total winding, are shown for 12-pole operation and for 4-pole operation. The arrow $c$ indicates a group of coils making up the 4-pole winding of which the centre coils of each group, indicated by the arrow $d$, fill the centre slots of each group of three and the outer coils indicated by the arrows $e$ and $f$ fill only the bottoms of the two outer slots of each group.

The corresponding phases are shown in relation to the coil sides for both 4-pole and 12-pole operation.

Having then determined the total number of conductors required for each part of the 4-pole winding, it remains to determine what number of conductors must be used in each slot for the two extra 12-pole windings in order to produce an effectively balanced 12-pole winding. This number is dependent upon the number of conductors used in the 4-pole winding, and also the distribution of the 4-pole conductors in the 3 slots available.

The number of conductors required for the 12-pole windings is in practice determined by the requirement to produce balanced E. M. F.'s and balanced M. M. F.'s for the 12-pole winding. From a consideration of the E. M. F.'s, it was found that with an arrangement comprising three winding slots having half the total conductors in the centre slot and a quarter of the total conductors in each of the outer slots, the total induced E. M. F. is increased in the ratio 9:8 as compared with an arrangement having an equal number of conductors in each slot. From this fact it may be determined that the total number of conductors required for each phase of the 12-pole windings is ¾ times the total number required for the complete 4-pole winding.

The same conclusion may be reached from a consideration of the requirement for balanced M. M. F.'s in the machines.

The largest gauge of conductor for which there is room is naturally to be used in the centre slots of each group of three. If the remaining conductors of the 4-pole windings are of equal gauge, they will fill half of each outer slot leaving only one half of the slots for the extra 12-pole windings. However, a better thermal balance is obtained by reducing the gauge of the 4-pole conductors and placing them at the bottom of the outer slots. Since there are fewer 4-pole conductors in each outer slot than in each centre slot, it is permissible for them to be of higher resistance. Such an arrangement permits the gauge of the 12-pole conductors in each outer slot to be correspondingly increased, and in a practical embodiment of such a machine, the 12-pole conductors occupy two-thirds of each outer slot, the 4-pole conductors occupy one-third. This preferred distribution and proportioning of the conductors is shown in Figure 4, in which the centre slot of the group of three shown is filled by half the conductors making up the 4-pole winding. The remaining half of the conductors are distributed equally between the outer slots. They are wound at the bottom and of such gauge as to occupy one-third of the space. The remaining two-thirds of the space in each outer slot is occupied by a winding having ¾ the number of conductors of the whole of the 4-pole winding, that is 3/2 the number of conductors contained in the centre slot and the gauge is of such a reduced value that the conductors fill the remaining two-thirds of each outer slot.

Alternatively, it is possible to punch the outer slots deeper or wider than the centre slots, provided that the centre lines of the slots are not displaced. This course permits considerable relative adjustment between the various conductor gauges used in the windings, but it also involves special manufacturing arrangements in the manufacture of the stator frame itself. For this reason, all the slots were of the same shape and size in the preferred embodiment of the machine.

As mentioned above, the 4-pole conductors are placed at the bottom of the slots and the 12-pole conductors at the mouth of the slots. This arrangement is preferred, since it gives a lower value for the 12-pole leakage reactance. It is permissible to interchange the position of the two sets of conductors and such rearrangement improves the 4-pole performance of the machine a little, at the expense of the 12-pole performance.

Figure 5a shows the distribution of windings for the three slots per pole per phase arrangement of Figure 4, the hatched part representing the 4-pole winding, and superimposed on the winding diagram is the curve of the M. M. F. waveform for each phase obtained by reinforcing the middle part of each phase band of a 60° spread 3-phase winding in the ratio 2:1. The corresponding vector position is shown in Figure 5b.

The geometry of the resultant M. M. F. wave is shown in Figure 5c.

Figures 6a and 6c are equivalent diagrams corresponding to the vector position shown in Figure 6b.

The conclusion to be drawn from an analysis of the M. M. F. waveform diagrams of Figures 5c and 6c is that a partial concentration of the 4-pole winding in the centre slots of each group of three results in an increased 5th and 13th harmonic content and reduced 7th and 11th harmonic content. Since it is rare for any disadvantageous effects to result in practical operation other than the crawling due to the 7th harmonic, the modified M. M. F. waveform produced is a practical advantage.

It is of note that concentration of the winding solely into the centre slot results once more in an increase of 7th harmonic content. There is thus an optimum degree of winding concentration which may best be determined empirically, particularly if the slot dimensions are not uniform.

It is possible to have a pole-changing induction motor saturated at the higher speed but under-saturated at the lower speed by using the 4-pole delta, 12-pole star arrangement shown in Figure 1.

An experimental machine was wound to use the winding arrangement of Figure 1 and for nominal full flux at 400 volts 3-phase 50 cy./s. on 4-pole delta operation. Practical test with this machine showed the actual input for full flux to be 380 volts.

The same machine reconnected to provide the 4-pole delta, 12-pole delta arrangement of Figure 2 proved to be suitable for 300 volts 3-phase 50 cy./s. in 12-pole connection to provide the same flux density as for 380 volts input in 4-pole connection.

With these inputs to the machine, the usual short circuit tests were made and the pullout H. P. calculated from the results. Full load temperature tests were also made. The test performance obtained at 300 volts 3-phase 50 cy./s. input was as follows:

4-pole delta connection:
  Pullout H. P.—5.2 H. P.
  Continuous H. P. for 50° C. temperature rise— 3.75 H. P.
12-pole delta connection:
  Pullout H. P.—1.55 H. P.
  Continuous H. P. for 30° C. temperature rise— 0.85 H. P.

Test performance obtained at 380 volts 3-phase 30 cy./s. input were as follows:

4-pole delta connection:
  Pullout H. P.—8.4 H. P.
  Continuous H. P. for 50° C. temperature rise— 4.5 H. P.
12-pole star connection:
  Pullout H. P.—0.85 H. P.
  Continuous H. P. for 50° C. temperature rise— 0.65 H. P.

The frame used for this experimental machine was nominally a 5 H. P. 4-pole T. E. F. C. induction motor frame. The continuous rating figures are certainly below the best obtainable with the frame due to the unusually large winding clearances allowed. It is believed that the above figures for continuous rating could be improved by some 5% to 10%.

Further improvement of performance figure might be obtained by using a frame of greater diameter and smaller core length, such as one designed for an 8-pole winding.

As is common for 2-speed motors, the performance of a motor according to this invention may be improved somewhat at either speed at the expense of performance at the other speed.

It is believed that the delta/delta connections give the better balanced performance at the two speeds, especially for a constant torque load. However, the delta/star connection might be more suitable for a load where the torque rose rapidly with speed.

An induction motor according to the present invention can be further modified to operate at the speed ratios 1:3:6. The 4-pole winding described is effectively a standard 4-pole single layer winding modified by a part-concentration of the winding into the centre slot of each group of three.

Any 4-pole full pitch winding can be converted into a 2-pole winding by reversal of alternate coil groups in each phase. A variety of phase interconnections can be used to effect this result. The part-concentration of the winding in a machine according to the present invention does not affect this general principle.

The use of the 4-pole winding as part of the 4/12-pole combination requires that the 4-pole winding be connected in series-delta. This fact makes parallel-star the preferred arrangement for 2-pole operation.

Such an arrangement of the stator coils is shown in Figure 7, which is to be compared with the arrangement shown in Figure 1. In these two figures, the phases are correspondingly indicated in relation to the coils and, for 2-pole operation, the 3-phase supply is applied at the points $1_1$, $1_2$ and $1_3$ in Figure 7. In this arrangement, the coils between the terminals 4, 5 and 4, 6 carry no current. Additional lead out connections for effecting pole-switching to this arrangement are required from the terminals numbered 7 to 11, the points $-A_2$, $-A_3$ and $C_1$ being permanently connected.

On testing the experimental machine at 300 volts 3-phase 50 cy./s., the highest supply voltage which would permit of the parallel-star/delta/delta winding connections, the following performance figures in 2-pole operation were obtained:

Pullout H. P.—7.9 H. P.
Continuous H. P. for 50° C. temperature rise— 3.85 H. P.

With the machine arranged for parallel-star/delta/star connections and input of 380 volts 3-phase 50 cy./s., the following performance figures for 2-pole operation were obtained:

Pullout H. P.—12.7 H. P.
Continuous H. P. for 50° C. temperature rise— 5.0 H. P.

Addition of this third motor speed requires three further lead-out connections to be provided, making nine in all.

An induction motor according to the present invention can be further modified to operate at the speed ratios 1:2:3:6 by adding a 6-pole connection of the stator winding. A 6-pole parallel-star arrangement is shown in Figure 8 and is to be compared with the arrangements shown in Figure 1 and Figure 7. In these three figures, the phases are correspondingly indicated in relation to the coils and, for 6-pole operation, the 3-phase supply is applied at the points $L_1$, $L_2$ and $L_3$. Further lead out connections to effect pole-switching to this 6-pole arrangement are required from the terminals numbered 12 and 13 making thirteen connections in all, the points —$A_2$, —$A_3$ and $C_1$ being permanently connected as in the other arrangements discussed.

The coil connections described give the advantage that the maximum available winding space is used for the lowest two speeds, for which the rating conditions are most severe.

Distributions of coil sides and phase bands for the 6-pole and 2-pole arrangements are shown in Figure 9, which is to be compared with Figure 3. In these two figures, the same conductor sets are indicated by the same reference numbers.

With the machine arranged for 6-pole parallel-star connection and an input of 300 volts 3-phase 50 cy./s., the following performance figures were obtained:

Pullout H. P.—2.2 H. P.
Continuous H. P.—1.65 H. P.

With the machine arranged for 6-pole parallel-star connection and an input of 380 volts 3-phase 50 cy./s., the following performance figures were obtained:

Pullout H. P.—3.5 H. P.
Continuous H. P.—2.1 H. P.

I claim:

1. A 3-phase pole-changing induction motor having a first set of three phase primary windings disposed in slots each of 60° spread, each wound into at least one group of three said slots, to be connected at will as a 3-phase delta winding distributed to provide $n$ poles and to be connected as one phase of a winding distributed to provide $3n$ poles and selected from the class consisting of delta and star windings, said motor having two further phase windings each of 60° spread wound in the outer slots of groups of said slots and connected as the other two phases of a winding distributed to provide $3n$ poles and selected from the class consisting of delta and star windings, the first set of phase windings in said motor comprises N conductors, more than one third of which conductors are wound in the center slot of each group of said slots while the remaining conductors are divided substantially equally between the two outer slots of each group of slots, and the two further phase windings in said motor have each fewer than N windings, the arrangement being such that the motor when connected to provide $n$ poles, runs at three times its speed when connected to provide $3n$ poles and the 7th harmonic content of the magnetomotive force waveform when connected to provide $n$ poles is less than if the conductors of the first set of phase windings had been equally divided between the slots of each group.

2. A 3-phase pole-changing induction motor as defined in claim 1, in which the three phase windings of the first set are each center-tapped and connected as the three phases of a winding distributed to provide $\frac{1}{2}n$ poles and, selected from the class consisting of delta and star windings, the two halves of each center-tapped winding being connected in reverse senses, the arrangement being such that the motor when connected to provide $\frac{1}{2}n$ poles runs at twice its speed when connected to provide $n$ poles.

3. A 3-phase pole-changing induction motor as defined in claim 2, in which the center tap of each of the three phase windings of the first set is connected to one of the three phase supply conductors, and the outer ends of all three windings are connected to a common point to provide a parallel-star connection.

4. A 3-phase pole-changing induction motor as defined in claim 1, in which of the N conductors of the first set of phase windings substantially ½N are wound in the center slot and substantially ¼N are wound in each of the outer slots of the group of three slots.

5. A 3-phase pole-changing induction motor as defined in claim 1, in which the two further phase windings of the motor each comprise substantially ¾N conductors.

6. A 3-phase pole-changing induction motor having a first set of three phase-windings disposed in stator slots each of 60° spread, each wound into at least one group of three stator slots, and to be connected at will as a 3-phase delta winding distributed to provide $n$ poles and to be connected as one phase of a winding distributed to provide $3n$ poles and selected from the class consisting of delta and star windings, said motor having two further phase windings each of 60° spread wound in the outer slots of groups of said slots and connected as the other two phases of a winding distributed to provide $3n$ poles and selected from the class consisting of delta and star windings, the first set of phase windings in said motor comprises N conductors, more than one third of which conductors are wound in the center slot of each group of slots while the remaining conductors are divided substantially equally between the two outer slots of said group of slots, and the two further phase windings in which motor have each fewer than N windings, the first set of three phase windings and the two further phase windings being all center-tapped and connected as the three phases of a winding distributed to provide $\frac{2}{3}n$ poles and selected from the class consisting of delta and star windings, the arrangement being such that the motor when connected to provide $\frac{2}{3}n$ poles run at two-thirds its speed when connected to provide $n$ poles.

7. A 3-phase pole-changing induction motor as defined in claim 6, in which the first set of three phase windings are connected with the two halves of each winding in parallel and in reverse sense and with the three windings in series to provide one phase winding of a parallel-star connection and the further two phase windings are each connected with the two halves of each winding in parallel and in reverse sense to provide one of the other two phase windings.

8. A 3-phase pole-changing induction motor as defined in claim 6, in which the three phase windings of the first set are each center-tapped and connected as the three phases of a winding distributed to provide $\frac{1}{2}n$ poles and selected from the class consisting of delta and star windings, the two halves of each center-tapped winding being connected in reverse senses, the arrangement being such that the motor when connected to provide $\frac{1}{2}n$ poles runs at twice its speed when connected to provide $n$ poles.

9. A 3-phase pole-changing induction motor as defined in claim 8, in which the windings are connected at will to provide a 2-pole, 4-pole, 6-pole and 12-pole motor.

10. A 3-phase pole-changing induction motor as defined in claim 6, in which the center tap of each of the three phase windings of the first set is connected to one of the three phase supply conductors, and the outer ends of all three windings are connected to a common point to provide a parallel-star connection.

11. A 3-phase pole-changing induction motor as defined in claim 6, in which of the N conductors of the first set of phase windings substantially ½N are wound in the center slot and substantially ¼N are wound in each of the outer slots of the group of three slots.

12. A 3-phase pole-changing induction motor as defined in claim 6, in which the two further phase windings of the motor each comprise substantially ¾N conductors.

13. A 3-phase pole-changing induction motor having a first set of three phase-windings disposed in stator slots each of 60° spread, each wound in at least one group of three stator slots, to be connected at will as a 3-phase delta winding distributed to provide $n$ poles and to be connected as one phase of a winding distributed to provide $3n$ poles and selected from the class consisting of delta and star windings, said motor having two further phase windings each of 60° spread wound in the outer slots of groups of said slots and adapted to be connected as the other two phases of a winding distributed to provide $3n$ poles and selected from the class consisting of delta and star windings, the first set of phase windings in said motor comprising N conductors, substantially ½N of which are wound in the center slot of each group of slots while substantially ¼N are wound at the bottom of the outer slots of the group, their gage being such that they occupy substantially one third of the cross-sectional area of the outer slots, the two further phase windings of said motor having each substantially ¾N conductors wound at the top of the outer slots of the group, their gage being such that they occupy substantially the remaining two-thirds of the cross-sectional area of the outer slots, the arrangement being such that the motor when connected to provide $n$ poles runs at three times its speed when connected to provide $3n$ poles and the 7th harmonic content of the magnetomotive force waveform when connected to provide $n$ poles is less than if the conductors of the first set of phase windings had been equally divided between the slots of each group.

<p style="text-align: center;">No references cited.</p>